(12) United States Patent  
Burnham et al.

(10) Patent No.: US 7,905,463 B2  
(45) Date of Patent: Mar. 15, 2011

(54) MULTIPLE AXIS GIMBAL EMPLOYING NESTED SPHERICAL SHELLS

(75) Inventors: Heidi Burnham, Bar Harbor, ME (US); Marc Daigle, Concord, MA (US)

(73) Assignee: Optical Alchemy, Inc., Nashua, NH (US)

( * ) Notice: Subject to any disclaimer, the term of this patent is extended or adjusted under 35 U.S.C. 154(b) by 668 days.

(21) Appl. No.: 11/909,129

(22) PCT Filed: Dec. 13, 2005

(86) PCT No.: PCT/US2005/045223  
§ 371 (c)(1), (2), (4) Date: Jan. 3, 2008

(87) PCT Pub. No.: WO2006/065892  
PCT Pub. Date: Jun. 22, 2006

(65) Prior Publication Data  
US 2010/0019120 A1    Jan. 28, 2010

Related U.S. Application Data

(60) Provisional application No. 60/635,580, filed on Dec. 13, 2004.

(51) Int. Cl.  
*F16M 13/00* (2006.01)  
*G03B 39/00* (2006.01)

(52) U.S. Cl. .................. 248/550; 248/177.1; 248/184.1; 396/13; 74/5.34

(58) Field of Classification Search ............... 248/177.1, 248/660, 550, 637, 184.1, 274.1; 396/12, 396/13; 348/144, 147, 211, 99; 74/5.34  
See application file for complete search history.

(56) References Cited

U.S. PATENT DOCUMENTS

| | | | |
|---|---|---|---|
| 3,226,984 | A | 1/1966 | Humphrey |
| 3,252,338 | A | 5/1966 | Senger |
| 3,599,165 | A | 8/1971 | Wendell |
| 3,638,502 | A | 2/1972 | Leavitt et al. |
| 4,125,799 | A | 11/1978 | Harduvel |
| 4,242,917 | A | 1/1981 | Bennett et al. |
| 4,375,878 | A | 3/1983 | Harvey et al. |
| 4,418,306 | A | 11/1983 | Samsel |
| 4,498,038 | A | 2/1985 | Malueg |
| 4,562,391 | A | 12/1985 | Inoue |
| 4,736,218 | A | 4/1988 | Kutman |
| 4,821,043 | A | 4/1989 | Leavitt |
| 4,949,026 | A | 8/1990 | Mead |
| 4,976,163 | A | 12/1990 | Schumacher |
| 4,989,466 | A | 2/1991 | Goodman |
| 5,124,938 | A | 6/1992 | Algrain |
| 5,256,942 | A | 10/1993 | Wood |
| 5,261,631 | A | 11/1993 | Bender et al. |

(Continued)

*Primary Examiner* — Anita M King  
(74) *Attorney, Agent, or Firm* — BainwoodHuang

(57) ABSTRACT

A multi-axis gimbal has each axis defined by a respective spherical shell driven by a flat, compact motor attached to the driven shell and to a next outer shell (or to an external mounting platform, in the case of the outermost shell). The shells rotate about respective axes. In one configuration, the outermost shell is referred to as the "azimuth" shell because in use it rotates about a vertical axis. The next inner shell is an elevation shell that rotates about a first horizontal axis that is orthogonal to the axis of the camera or other sensor payload. An optional third shell can be used to provide "roll" motion, such as rotating a camera about its axis to obtain a particular rotational orientation with respect to a target.

15 Claims, 26 Drawing Sheets

U.S. PATENT DOCUMENTS

| | | |
|---|---|---|
| 5,505,410 A | 4/1996 | Diesel et al. |
| 5,557,285 A | 9/1996 | Bender et al. |
| 5,751,578 A | 5/1998 | Quinn et al. |
| 5,765,043 A | 6/1998 | Tyler |
| 5,897,223 A | 4/1999 | Tritchew et al. |
| 5,907,433 A | 5/1999 | Voigt et al. |
| 5,995,758 A * | 11/1999 | Tyler .............................. 396/13 |
| 6,129,307 A | 10/2000 | Deoms et al. |
| 6,145,393 A | 11/2000 | Canton |
| 6,351,092 B1 | 2/2002 | Vaassen et al. |
| 6,484,978 B2 | 11/2002 | Voigt et al. |
| 7,193,204 B2 | 3/2007 | Mitchell |
| 7,264,220 B2 | 9/2007 | Dent et al. |
| 7,561,784 B2 * | 7/2009 | Wescott et al. ................. 396/13 |
| 2002/0063197 A1 | 5/2002 | Voight et al. |
| 2004/0065810 A1 | 4/2004 | Casteleiro |

* cited by examiner

MULTIPLE AXIS GIMBAL EMPLOYING NESTED SPHERICAL SHELLS

BACKGROUND

Gimbals are used as rotatable supports for cameras and other sensing payloads in a variety of applications, particularly in vehicle-mounted applications such as helicopters, unmanned aerial vehicles (UAVs), land vehicles such as trucks or armored vehicles, and spacecraft.

The basic configuration of a conventional prior art gimbal is one which dictates a necessarily costly and heavy frame structure in order to provide adequate stability. Weight, and very often cost, prevent these gimbals from being used on many platforms such as small helicopters and other lightweight air vehicles. The geometries of the azimuth and elevation axes require a very strong and stiff "yoke" structure. This becomes the large and heavy bulk of the gimbal. Metals, usually steel and aluminum, must be incorporated into the design in order for the gimbal to achieve the stability that an application requires. The manufacturing methods that are necessarily used are expensive and time consuming. This is a cost driver and accounts for much of the overall weight.

The elevation axis is anchored by this yoke and resides within the azimuth structure. Most payloads are carried directly by the elevation axis structure. Due to this arrangement, the available payload space tends to be very small in relation to the extents of the azimuth structure. In rare instances a third, roll axis is included. This resides within the elevation structure, further reducing the payload volume. The need for this configuration to be stable and stiff also dictates costly and heavy materials.

For these reasons, this standard design is expensive and prevents these gimbals from offering low weight with enough payload space for many applications.

SUMMARY

A proposed multi-axis gimbal overcomes the above obstacles by means of a novel approach to the geometry of the gimbal. Each axis is defined by a respective spherical shell driven by a flat, compact motor attached to the driven shell and to a next outer shell (or to an external mounting platform, in the case of the outermost shell). The shells rotate about respective axes. In one configuration, the outermost shell is referred to as the "azimuth" shell because in use it rotates about a vertical axis. The next inner shell is an elevation shell that rotates about a first horizontal axis that is orthogonal to the axis of the camera or other sensor payload. An optional third shell can be used to provide "roll" motion, such as rotating a camera about its axis to obtain a particular rotational orientation with respect to a target.

The inherent stiffness of the geometry of a sphere is utilized to provide the stability that would be required by even a sensitive optical system. The spheres can be relatively thin-walled and made of plastic, such as polycarbonate. This aspect alone reduces the weight by many pounds and makes production cost-effective.

The way the spheres interrelate also makes the three-axis configuration a space effective one. These "nested" spheres allow a tremendous increase in payload volume for a given outer diameter.

This geometry also allows modularity, giving the end user the option to delete the roll axis if the application does not require it. Size may vary. The exterior shell diameter can be increased or decreased as space allows. The shells can maintain their relative sizes without compromising stiffness and stability.

The disclosed gimbal provides multiple-axis targeting and pointing stability to a variety of sensing applications while being lightweight and low cost. It also offers a larger ratio of payload capacity to overall size than a conventional gimbal. The gimbal has the following main elements: a mechanized drive system to control each axis, and a spherical housing to provide structural support for each axis. The number of axes relies upon the needs of the end user. The gimbal is scaleable in both size and functionality.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 25 depicts pertinent portions of a gimbal employing wet or dry fluid bearing between;

DETAILED DESCRIPTION

Figure 1:
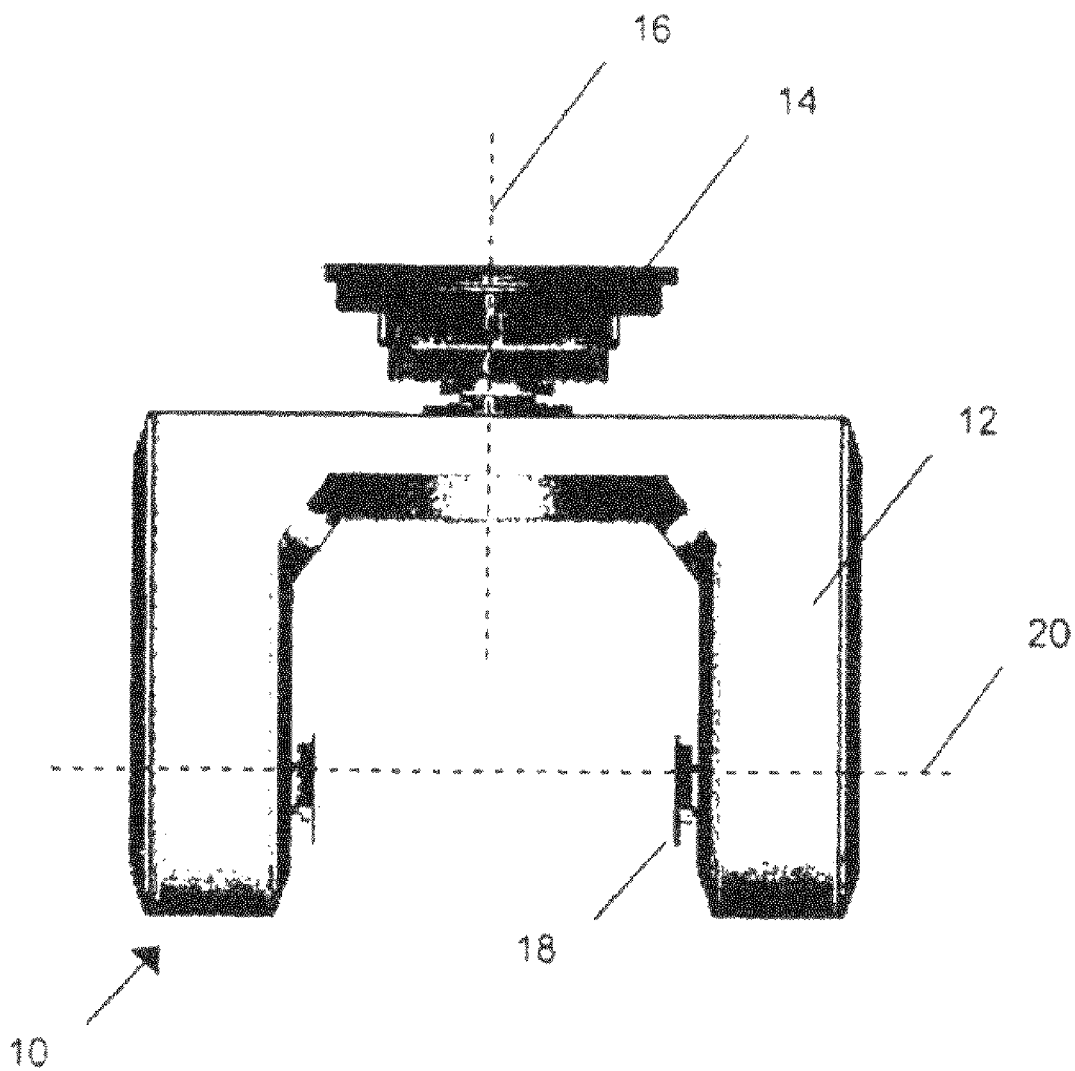
FIG. 1 is an elevation view of a prior art yoke-type gimbal.

FIG. 1 shows a gimbal 10 of the "yoke" type as described above. The gimbal 10 has a frame 12 with an inverted "U" shape, which is coupled to a mount 14 for rotation about an azimuth axis 16. At the ends of the frame 12 are two inward-facing mounts 18 for a payload (not shown) that can be rotated about an elevation axis 20. As discussed above, the frame 12 of the yoke type of gimbal 10 is generally large and heavy, and therefore may not be a good candidate for use in certain applications.

Figure 2:
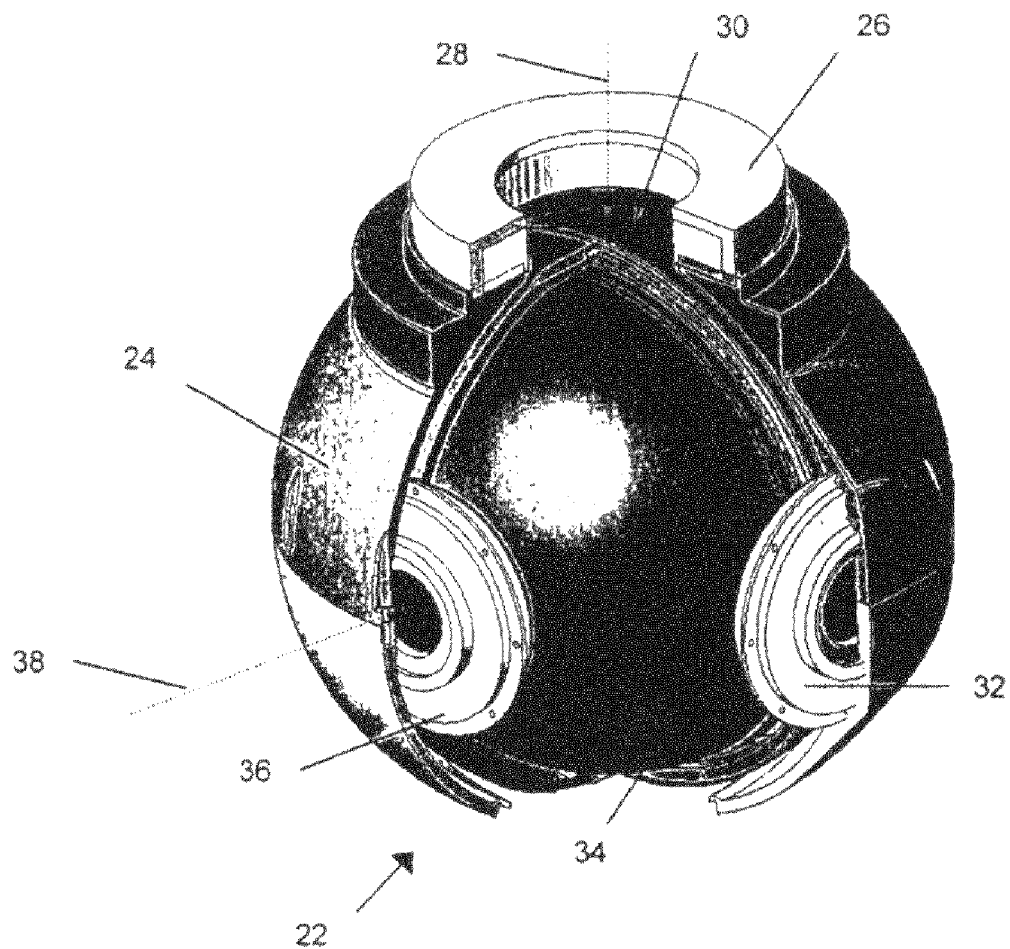
FIG. 2 is a perspective schematic rendering of a multiple axis gimbal in accordance with the present invention.

FIG. 2 is a schematic depiction of a multiple-axis gimbal 22 employing a different type of support structure, namely a set of nested spherical shells. As shown, an outer (azimuth) shell 24 may have a motor 26 for rotating the gimbal 22 (and internal payload) about an azimuth axis 28. A next inner (elevation) shell 30 is coupled to the outer shell 24 by a motor 32 which provides for elevational rotation. Some applications may benefit from a third (roll) shell 34 and motor 36 to achieve rotation about a "roll" axis 38. Each motor 26, 32 and 36 may be a direct-drive or "torque" motor with a position encoder to sense motor position. The position encoder may be any of different types, including magnetic and optical.

Figure 3:
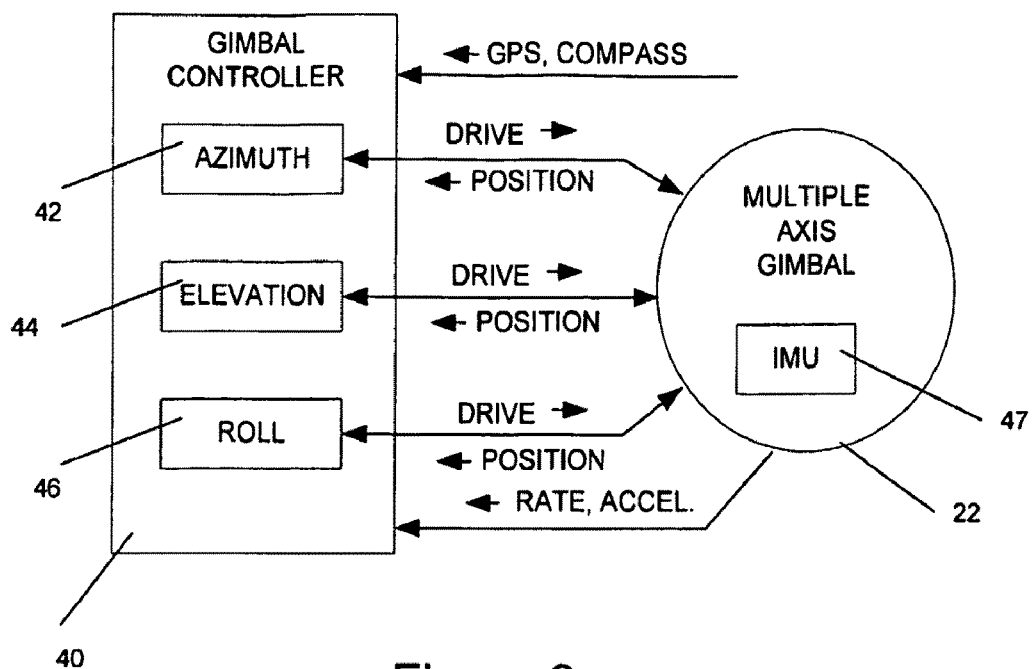
FIG. 3 is a block diagram of a sensor system employing the multiple axis gimbal of FIG. 2.

FIG. 3 illustrates an overall gimbal system including a gimbal 22 and a controller 40. The controller 40 includes separate sub-controllers 42, 44 and 46 for the azimuth, elevation, and roll motors 26, 32 and 36. Each sub-controller 42, 44 and 46 provides respective drive signals to the respective motor 26, 32 and 36, and receives respective position signals from the respective position encoder. An inertial measurement unit (IMU) 47 within the gimbal 22 provides rate and acceleration (RATE, ACCEL.) information back to the gimbal controller 40. The gimbal controller 40 also receives GPS and compass information from external devices not shown in FIG. 3.

Figure 4:
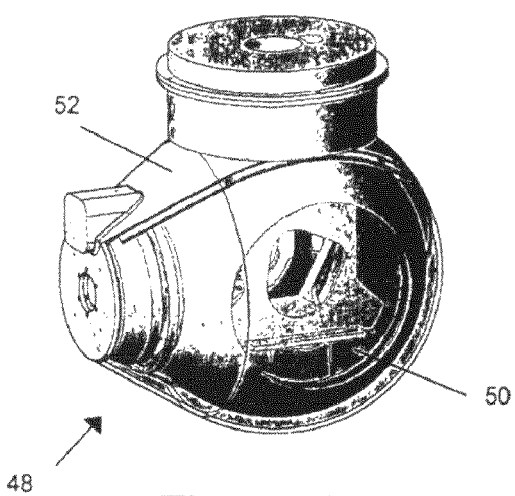
FIG. 4 is a perspective solid-model view of a first multiple axis gimbal.

FIG. 4 shows a first gimbal 48 which is an embodiment of the schematically depicted gimbal 22 of FIG. 2. The first gimbal 48 employs a transparent hemisphere 50 on its outer shell 52. The hemisphere 50 provides protection for the gimbal interior, including the payload. In the illustrated embodiment, the hemisphere 50 is translucent to visible light, and may be made of synthetic sapphire for example. In alternative embodiments, other materials that are translucent in other ranges of the electromagnetic spectrum, such as in the infrared region for example, may be employed.

Figure 5:
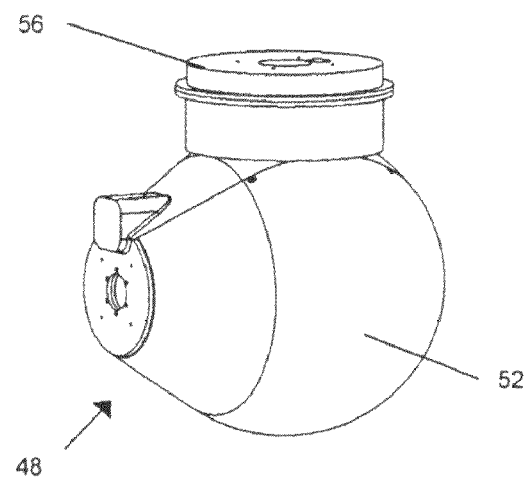
FIG. 5 is a perspective line drawing of the gimbal of FIG. 4.

FIG. 5 shows the first gimbal 48 in a perspective, line drawing format. At the top of the outer shell 52 is an azimuth motor assembly 54 that includes the azimuth motor 26 (with position encoder; see FIG. 2). FIGS. 4 and 5 both show the azimuth motor assembly 54 as including a cylindrical mount 56 by which the gimbal 48 can be mounted to a vehicle or other platform.

Figure 6:
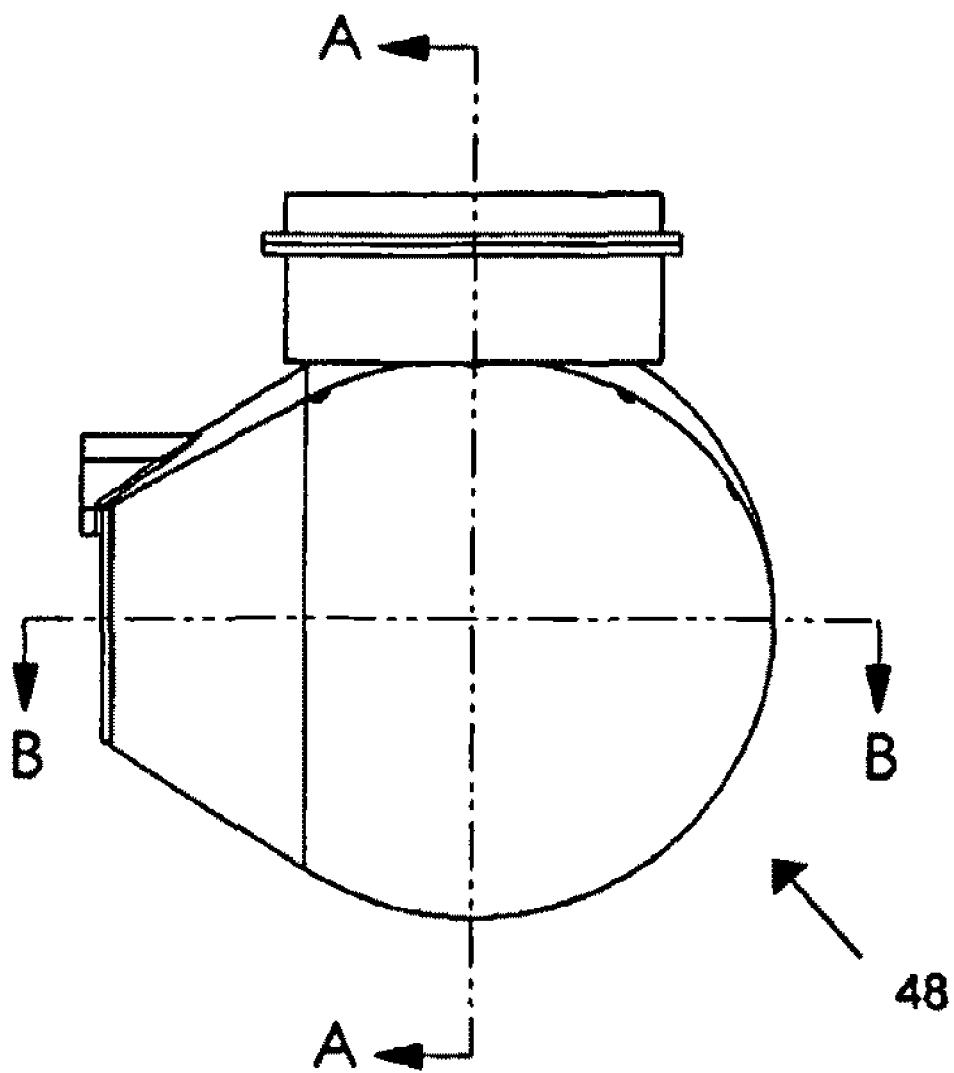
FIG. 6 is a side view of the gimbal of FIG. 4.
Figure 6A:
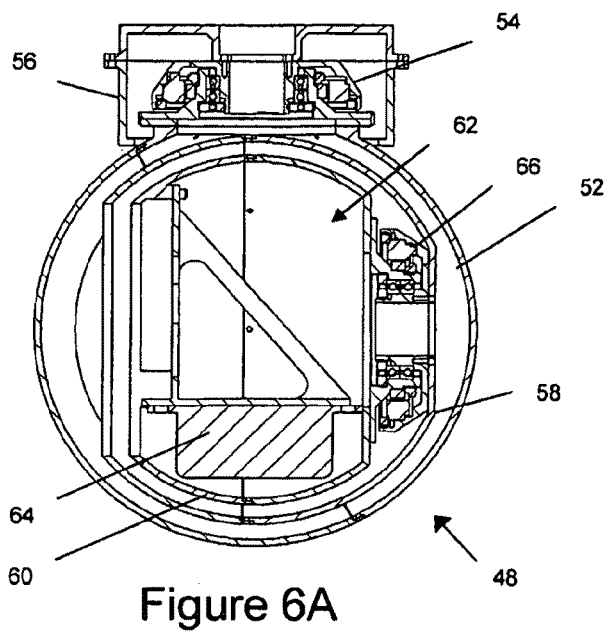
FIGS. 6A and 6B are section views along lines A-A and B-B of FIG. 6.
Figure 6B:
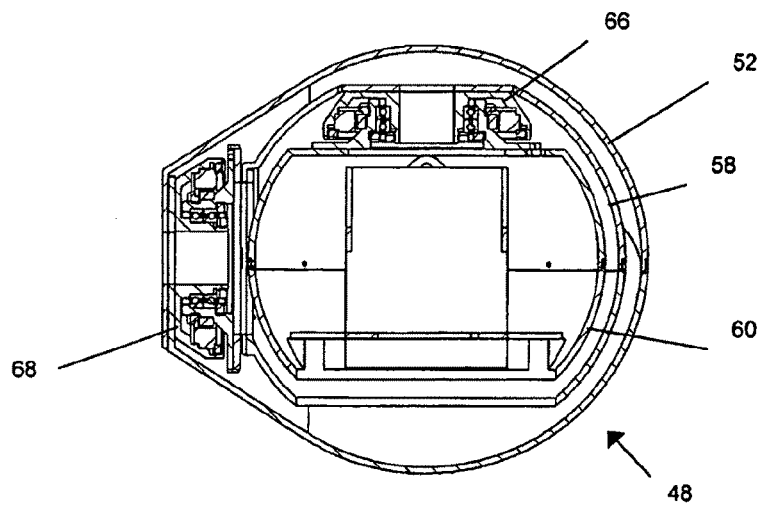

FIG. 6 shows a front elevation view of the gimbal 48 with two section lines A-A and B-B. FIG. 6A shows the view of section A-A, and FIG. 6B shows the view of section B-B. In addition to the outer (azimuth) shell 52, the gimbal 48 includes an elevation shell 58 and a roll shell 60. The shells 58 and 60 have openings toward the left in FIG. 6A for the passage of light to the sensors (not shown), which are to be mounted in a rectangular space 62 within the roll shell 60. Within the roll shell 60 is a package of electronic circuitry referred to as an "inertial measurement unit" or IMU 64. The azimuth motor assembly 54 and a roll motor assembly 66 are also shown. Although in FIG. 6A the IMU 64 is shown as a single unit, in alternative embodiments the components that collectively provide the IMU function may be spatially distributed within the gimbal rather than being concentrated in a single physical package.

Figure 7:
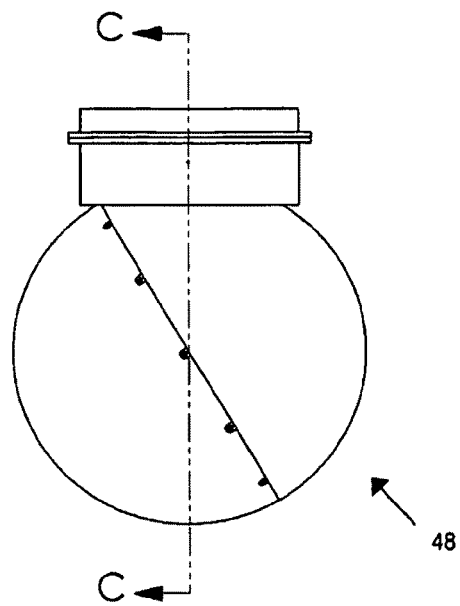
FIG. 7 is a rear view of the gimbal of FIG. 4.
Figure 7C:
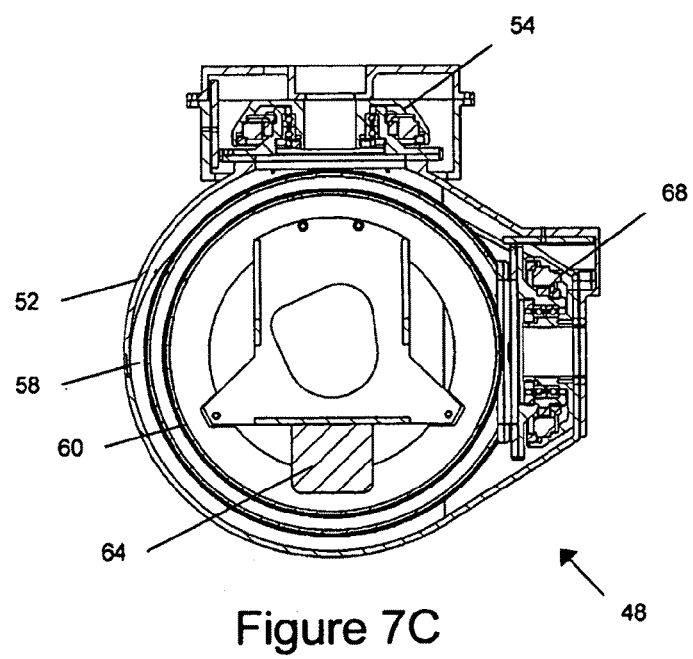
FIG. 7C is a section view along line C-C of FIG. 7.

FIG. 7 shows a side elevation view of the gimbal 48 with a section line C-C, and FIG. 7C shows a view of the section C-C. This view shows the elevation motor assembly 68 which is disposed between the azimuth shell 52 and the elevation shell 58.

Figure 8:
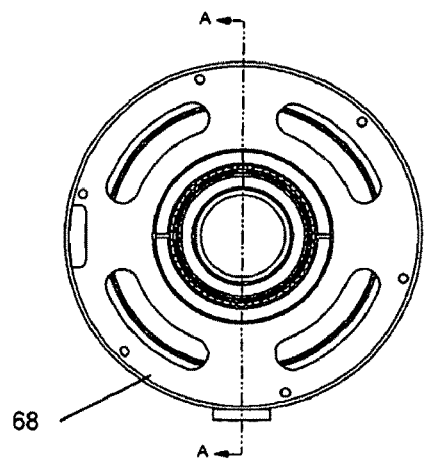
FIG. 8 is a plan view of a motor in the gimbal of FIG. 4.
Figure 8A:
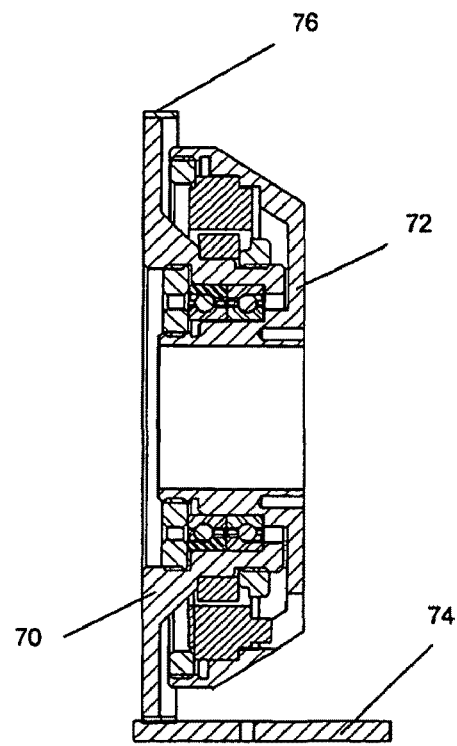
FIG. 8A is a section view along line A-A of FIG. 8.

FIG. 8 shows a plan view of the elevation motor assembly 68 with a section line A-A, and FIG. 8A shows the view along the section line A-A. The elevation motor assembly includes a rotor housing 70, stator housing 72, an encoder circuit board 74 and an encoder magnetic strip 76, which is disposed around a radially outer surface of rotor housing 70. During operation, magnetic sensing circuitry on the encoder board 74 detects a spatially periodic magnetic field created by the magnetic strip 76 and generates corresponding electrical encoder signals that indicate the rotational position of the elevation motor. These signals are provided as motor position feedback signals to the elevation motor sub-controller 44 (FIG. 3) which uses the signals to control the rotational position of the rotor 70 with respect to the stator 72. In the illustrated embodiment, the azimuth motor assembly 54 uses a similar arrangement to that shown in FIG. 8A.

Figure 9:
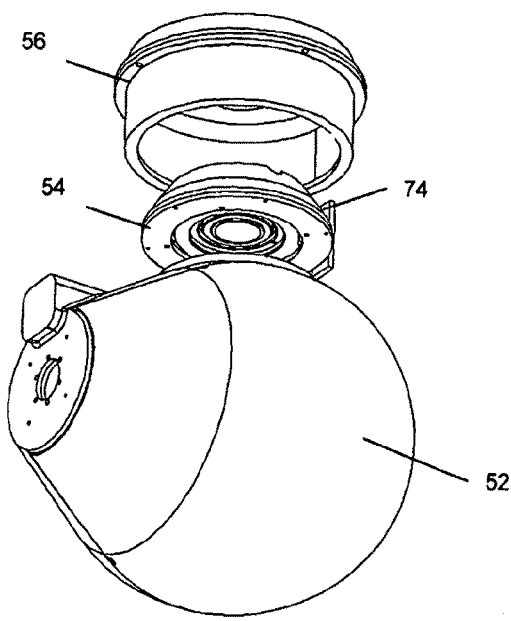
FIGS. 9 and 10 are perspective, semi-exploded views of the gimbal of FIG. 4 depicting the configuration of the azimuth motor and upper mounting member.
Figure 10:
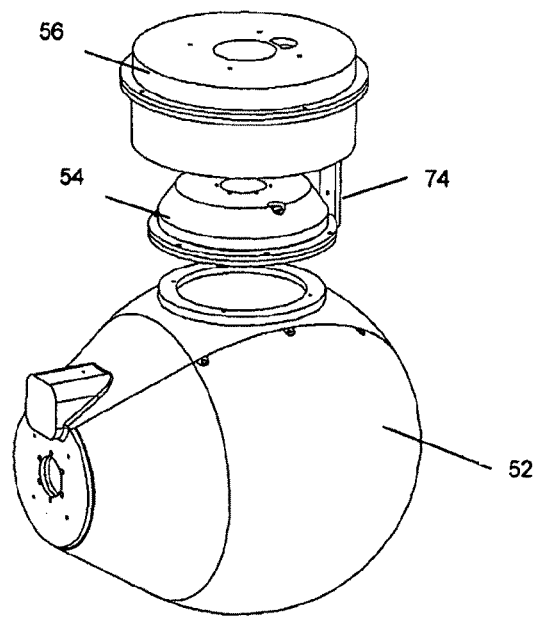

FIGS. 9 and 10 show the mounting arrangement in more detail. The azimuth motor assembly 54 including the encoder circuit board 74 fits within the cylindrical mount 56, and the stator 72 is secured to the mount 56. The rotor housing 70 is attached to the azimuth shell 52.

Figure 11:
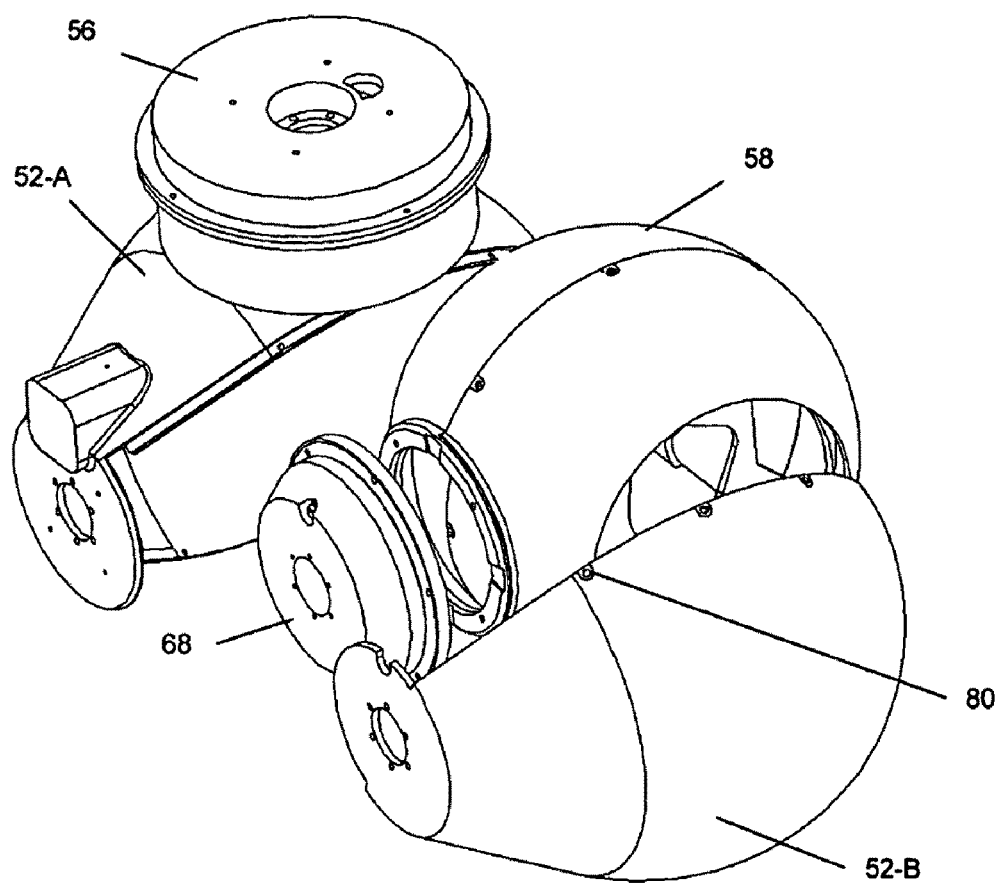
FIG. 11 is a perspective, semi-exploded view of the gimbal of FIG. 4 depicting the configuration of the elevation motor and elevation sphere within the outer (azimuth) shell.

FIG. 11 illustrates another aspect of the construction of the gimbal 48, namely the use of two half-shells 52-A and 52-B to form the azimuth shell 52. The half-shells 52-A and 52-B are attached to each other in a suitable manner. In the illustrated embodiment, the mating edges of the half-shells 52-A and 52-B form a lap joint, and through-holes 80 accept mounting hardware such as bolts or rivets to secure the two lapped edges together. In the illustrated embodiment, the elevation shell 58 and roll shell 60 are also formed in this manner, i.e., using two half-shells that are mechanically coupled together.

Figure 12:
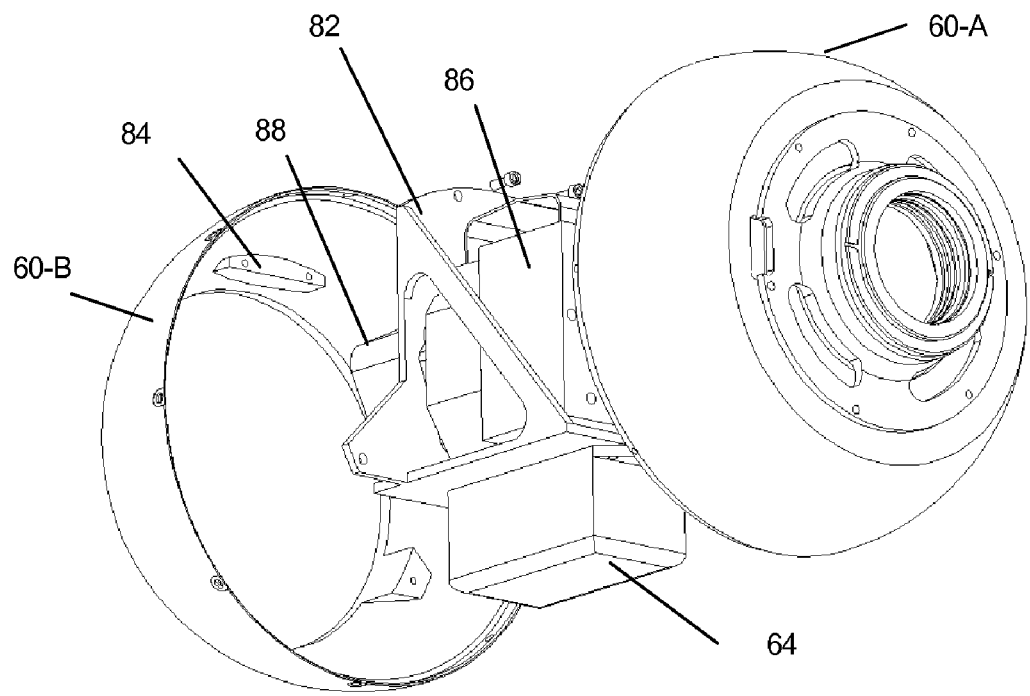
FIGS. 12 and 13 are perspective, semi-exploded views of the inner (roll) shell of the gimbal of FIG. 4 showing the presence and absence of a payload camera on a payload frame.
Figure 13:
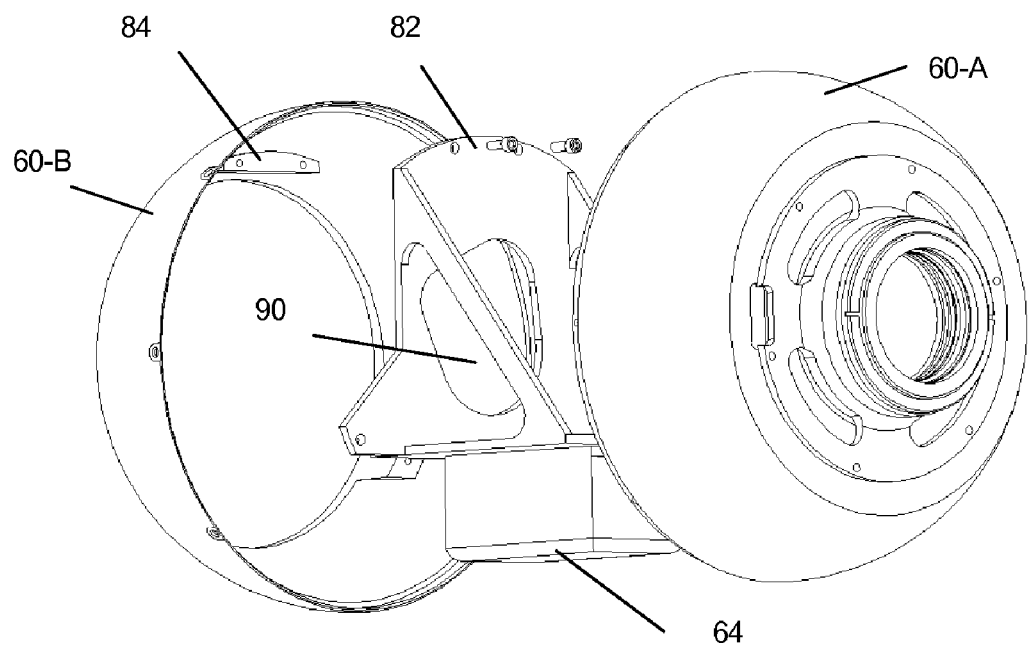

FIGS. 12 and 13 illustrate the configuration of the roll shell 60 and its inner payload. The roll shell 60 has two half-shells 60-A and 60-B which are coupled together as described above with respect to the azimuth shell 52. Within the roll shell 60 is mounted a payload frame 82 to which is attached the IMU 64 at attachment points 84. The payload frame 82 receives a payload such as a camera 86. An extended front portion 88 of the camera 86 is disposed through an opening 90 of the payload frame.

FIGS. 14-22 illustrate a second gimbal 92 of the same general type as depicted in FIG. 2. Many of the elements of the gimbal 92 are similar to corresponding elements of the gimbal 48, so any such elements of the gimbal 92 are referred to using the same reference number with the addition of a single quote mark. Thus the gimbal 92 includes an azimuth shell 52' having two half shells 52-A' and 52-B', etc. The main differences between the two gimbals 48 and 92 are described below.

Figure 14:
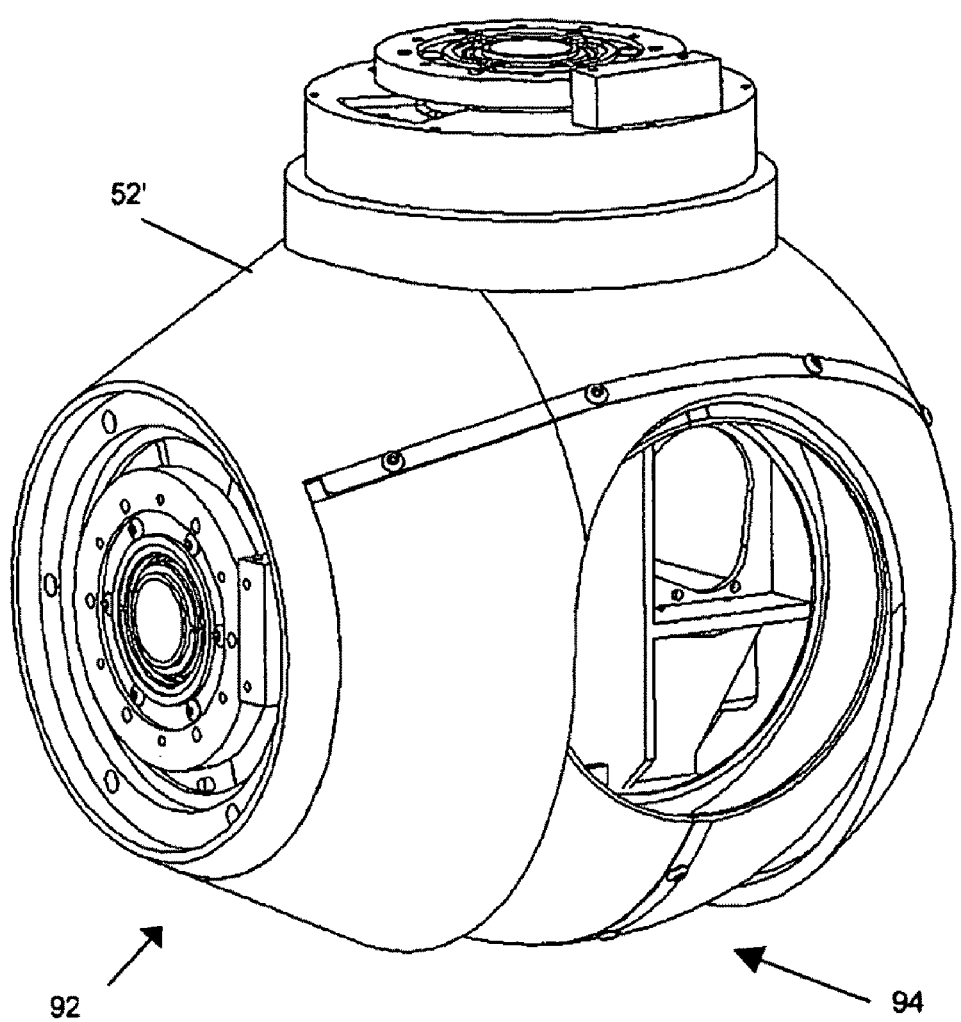
FIG. 14 is a perspective line drawing of a second multiple axis gimbal.
Figure 15:
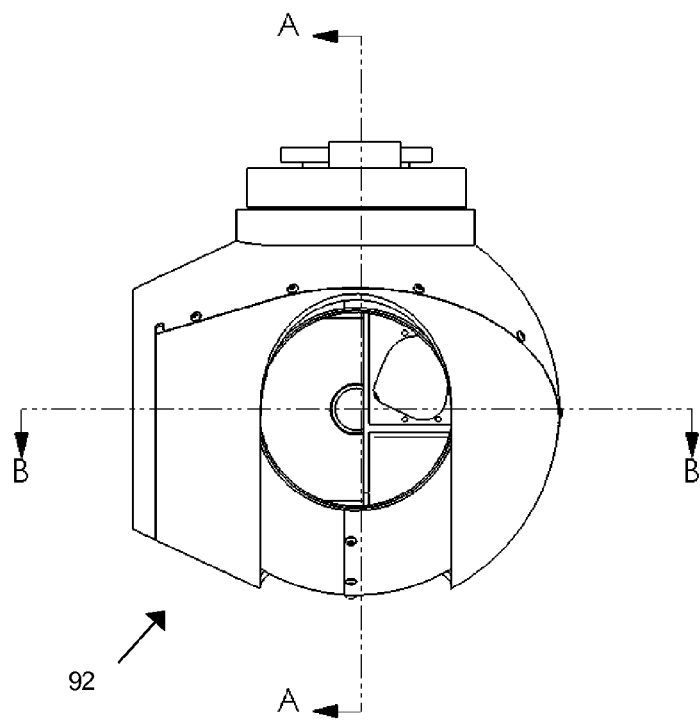
FIG. 15 is a side view of the gimbal of FIG. 14.
Figure 15A:
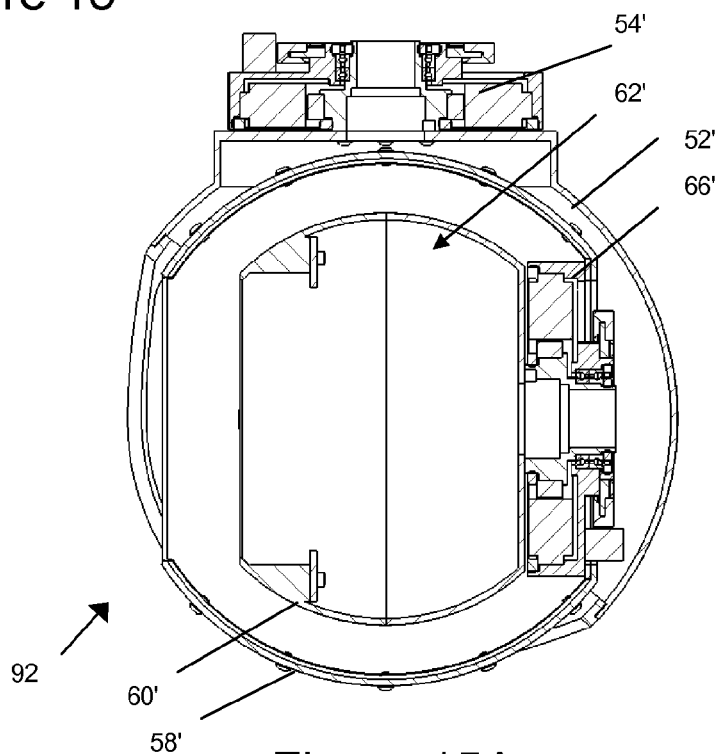
FIGS. 15A and 15B are section views along lines A-A and B-B of FIG. 15.
Figure 15B:
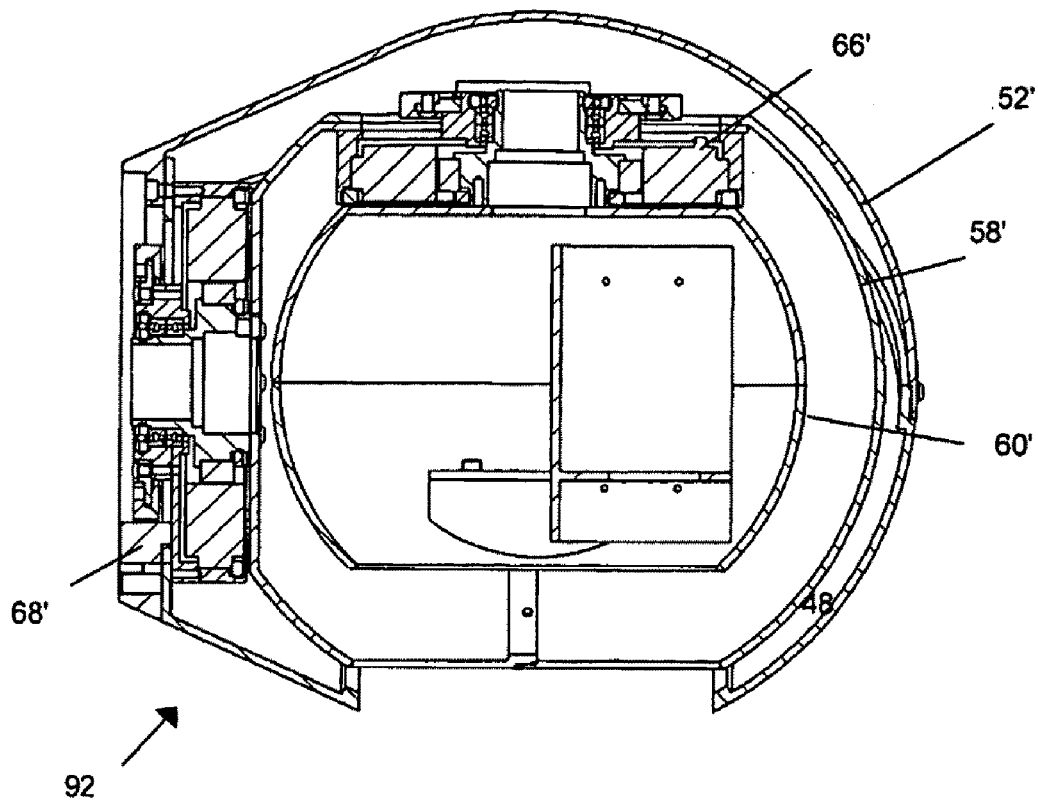
Figure 16:
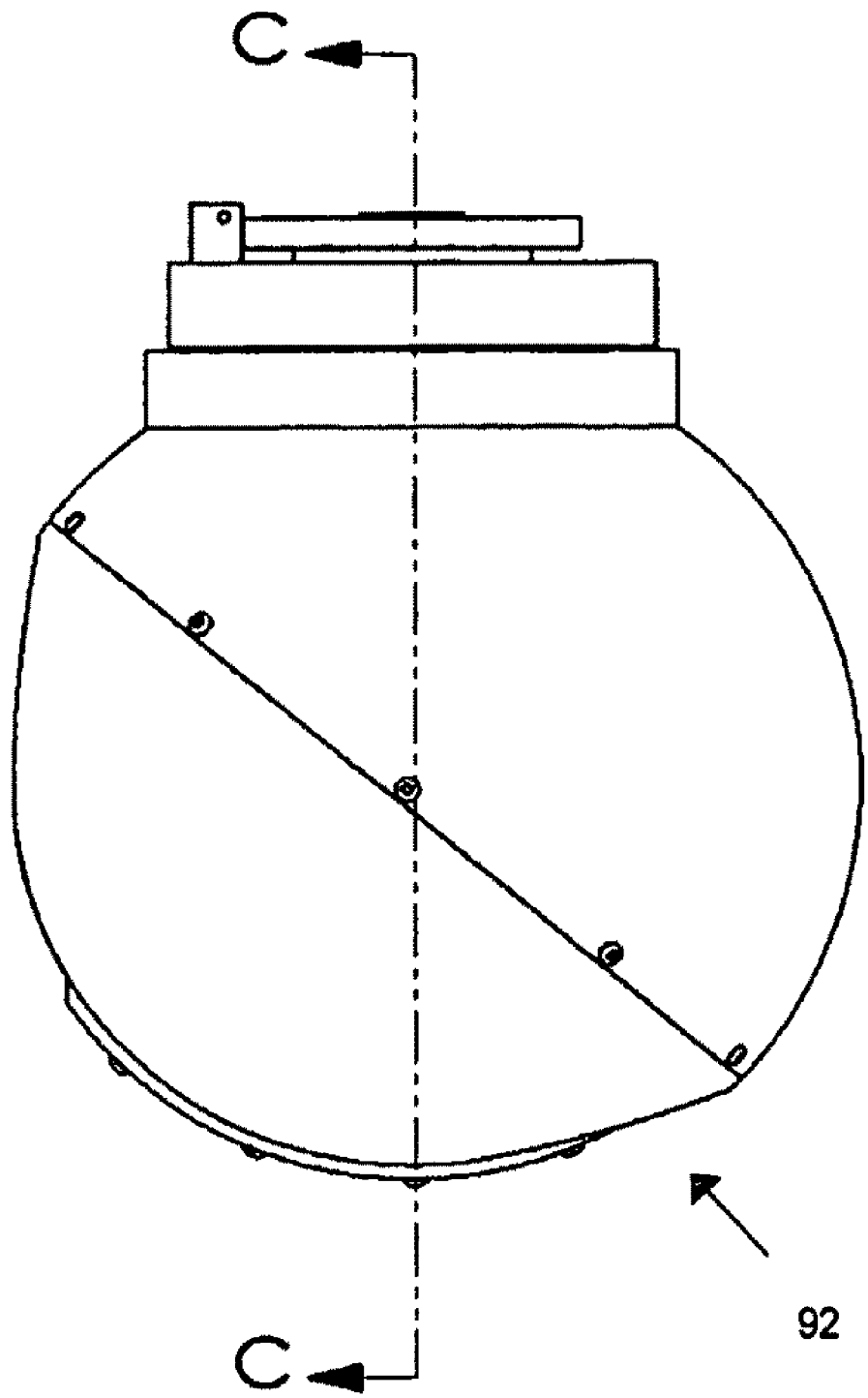
FIG. 16 is a rear view of the gimbal of FIG. 14.
Figure 16C:
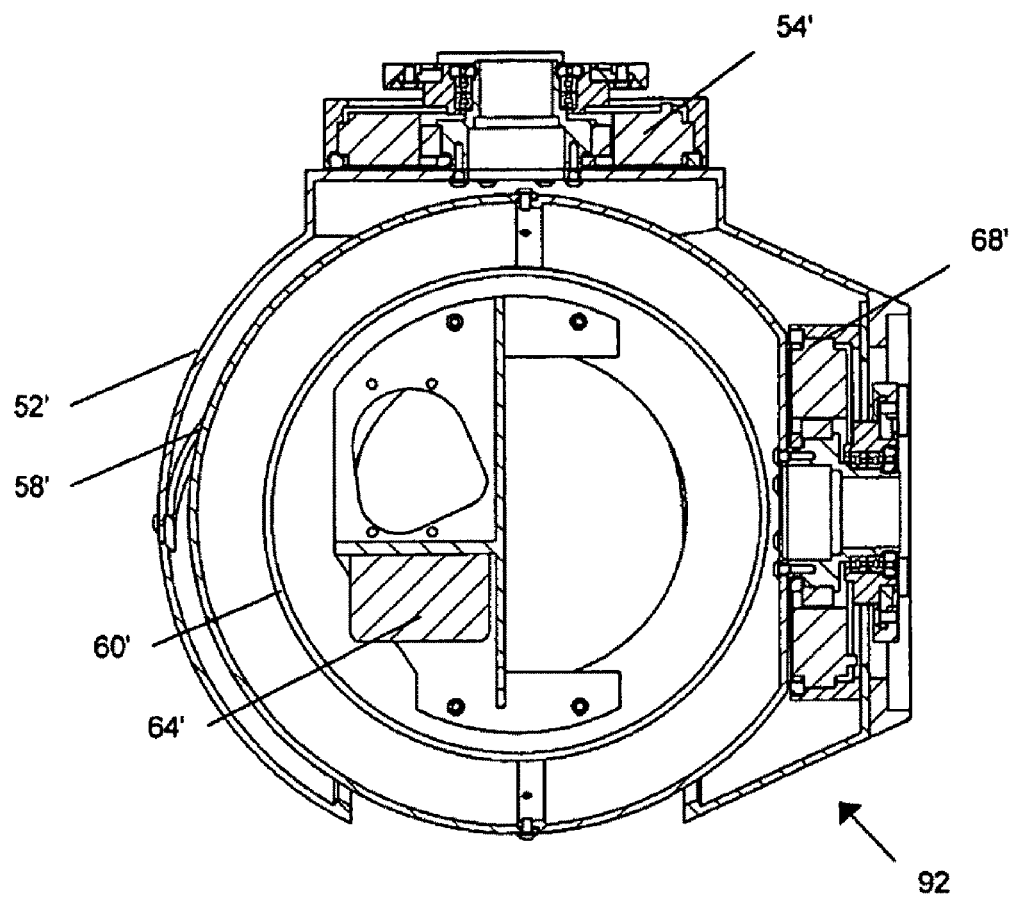
FIG. 16C is a section view along line C-C of FIG. 16.

Referring to FIG. 14, it will be seen that the azimuth shell 52' of the gimbal 92 has an elongated slot 94 in contrast to the transparent hemisphere 50 of the gimbal 48. The slot 94 extends approximately one-quarter of the way around the azimuth shell 52' to provide a range of elevation angles from horizontal (horizon) to straight down. The slot 94 is intended to be left open rather than covered. For some applications, any shell material might interfere with optimal operation of the camera or sensor, for example because of the particular frequencies of electromagnetic energy being sensed. The open arrangement enables operation at such frequencies.

Figure 17:
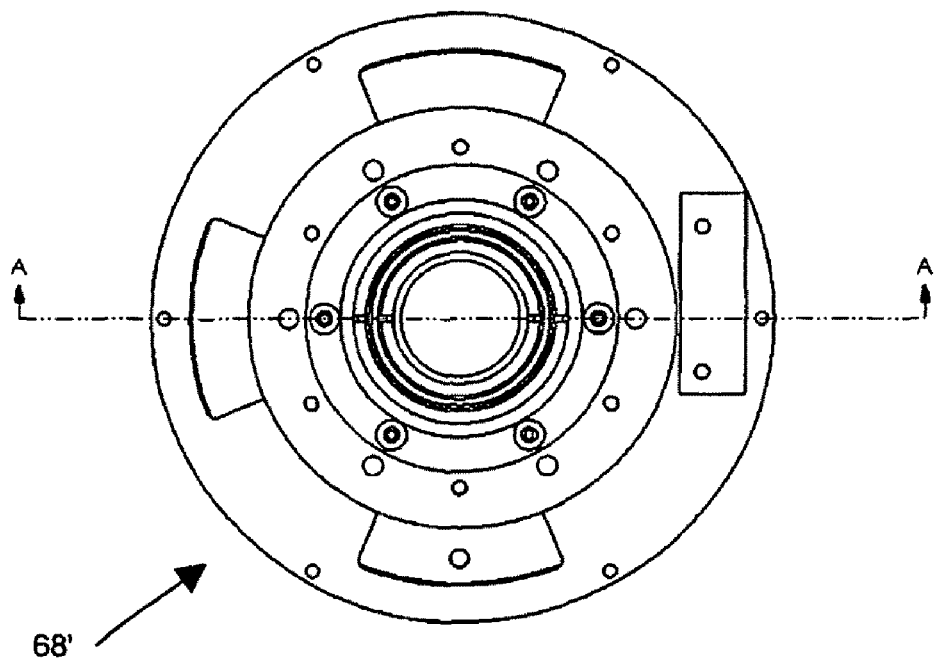
FIG. 17 is a plan view of a motor in the gimbal of FIG. 14.
Figure 17A:
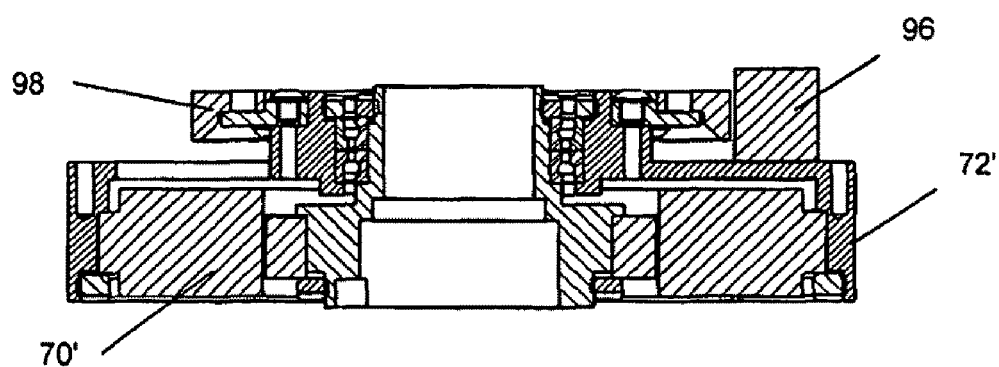
FIG. 17A is a section view along line A-A of FIG. 17.
Figure 18:
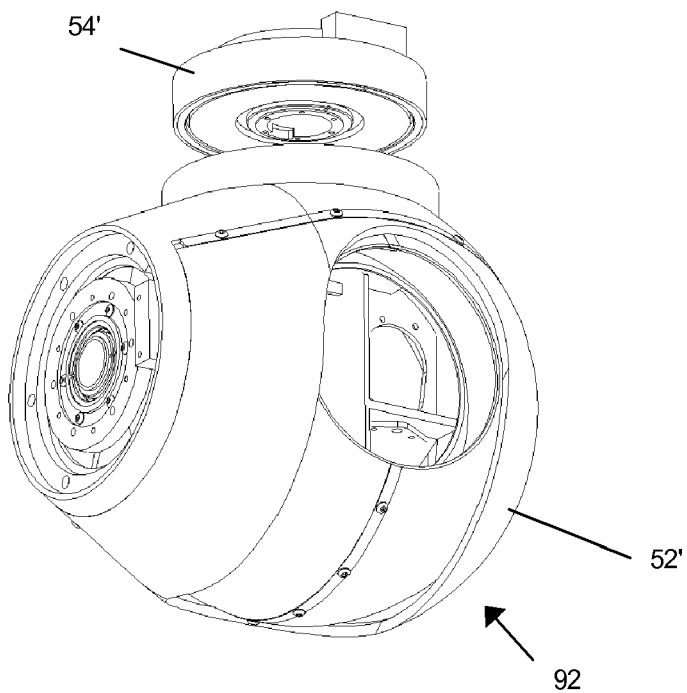
FIGS. 18 and 19 are perspective, semi-exploded views of the gimbal of FIG. 14 depicting the configuration of the azimuth motor and upper mounting member.
Figure 19:
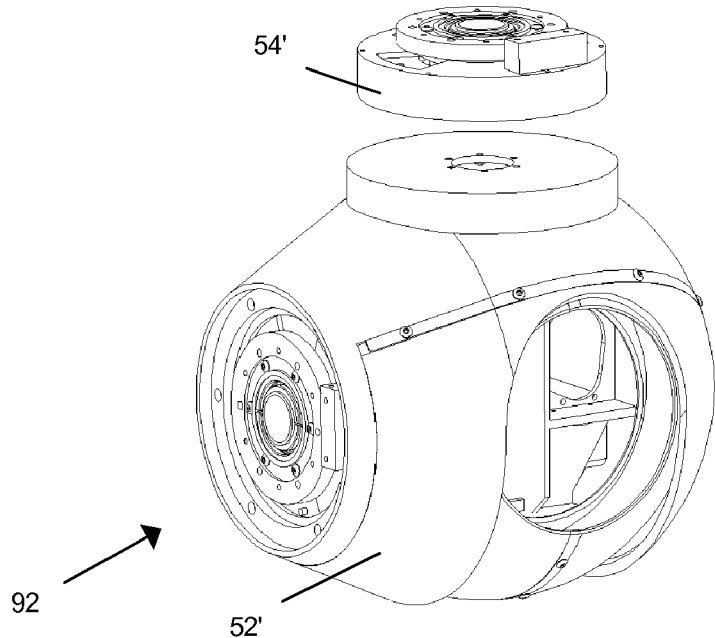
Figure 20:
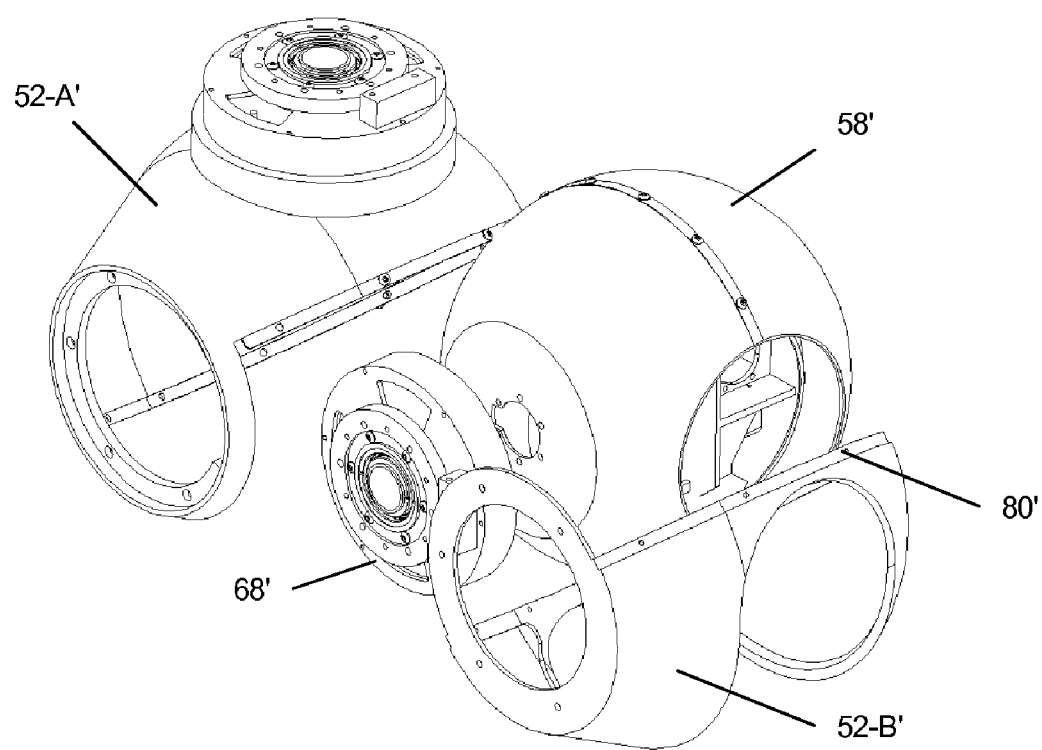
FIG. 20 is a perspective, semi-exploded view of the gimbal of FIG. 14 depicting the configuration of the elevation motor and elevation sphere within the outer (azimuth) shell.
Figure 21:
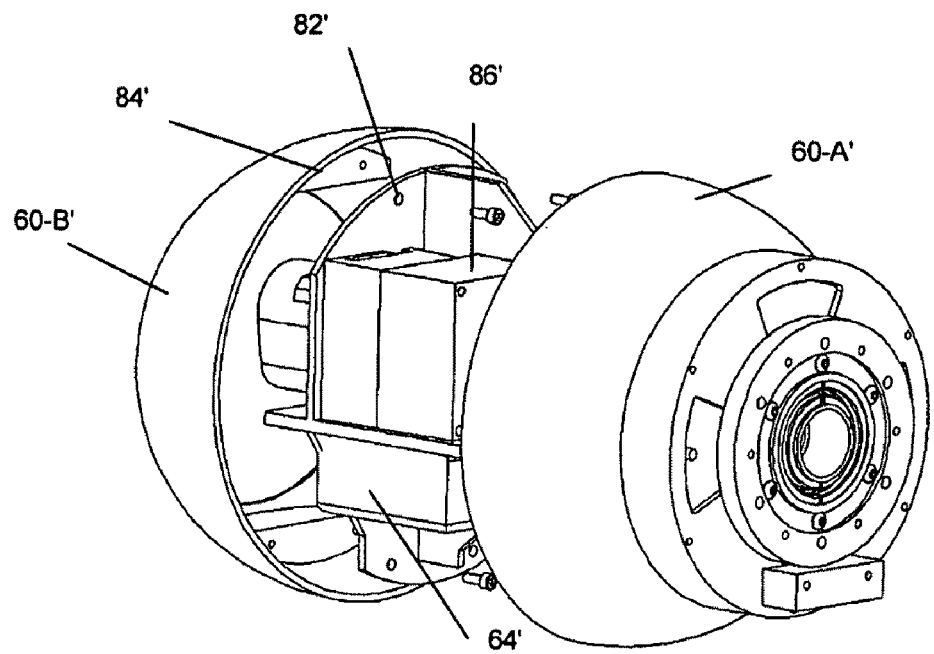
FIGS. 21 and 22 are perspective, semi-exploded views of the inner (roll) shell of the gimbal of FIG. 14 showing the presence and absence of a payload camera on a payload frame.
Figure 22:
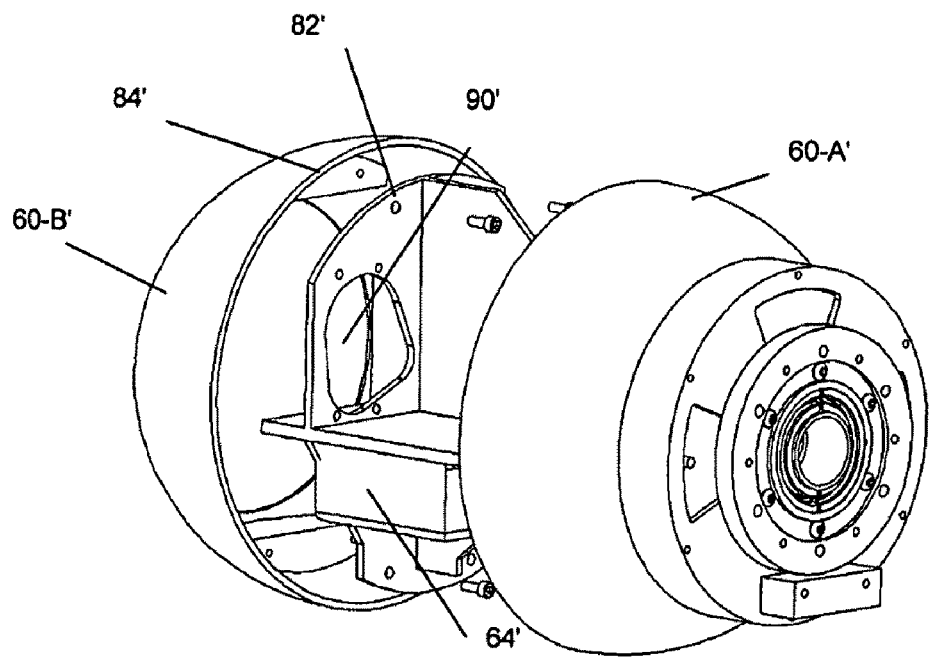

FIG. 17A shows that the motor assemblies of the gimbal 92 (e.g. the elevation motor assembly 68' as shown) employ a different type of position encoder. An encoder optical read head 96 is disposed on the stator housing 72', and an annular diffraction grating 98 is secured to the rotor 70'. The optical read head 96 detects an optical pattern created by light reflected from the diffraction grating 98 and generates the electrical position signals that are provided to the corresponding sub-controller 42, 44 and 46 (FIG. 3).

The gimbals 48 and 92 may optionally have or employ any of a variety of other features. As an example, there may be some type of sealing between the azimuth motor 54 and the mount 56, e.g. using O-rings or brushes. The innermost rotatable support element (i.e., roll or elevation spheres) may have other than a spherical shape, or may be only a partial sphere. For example, the roll support element could be planar, cubic, or a more arbitrary shape attached inside the elevation sphere via the roll motor.

In the illustrated embodiment, the hemispheres of each sphere are joined with lap joints. Alternative joining techniques include butt joints, slot-in-groove joints, etc. Additionally, in alternative embodiments the spheres may be formed from more than two elements, or from two complementary partial spheres other than hemispheres that are joined at other than an equator.

Also in the illustrated embodiment, each sphere is supported by only a single corresponding motor that couples the sphere to the next outer sphere at one pole of a rotational axis. The gimbal may employ additional support for one or more of the spheres, such as by using a bearing at the other pole of the rotational axis from the motor to reduce cantilever stresses. Ribbing or other structure may also be added to improve stiffness.

The disclosed gimbal is ideally suited for manufacture using conventional injection molding techniques. As an alternative to standard injection-molded plastics, composite materials and even metals may be employed instead.

The surface of each sphere need not be continuous and featureless such as shown in the Figures. Alternative embodiments may employ a ribbed or pocketed structure to reduce weight and increase stiffness. Such structure may be either in addition to or entirely instead of the continuous, featureless structure such as shown in the Figures.

Figure 23:
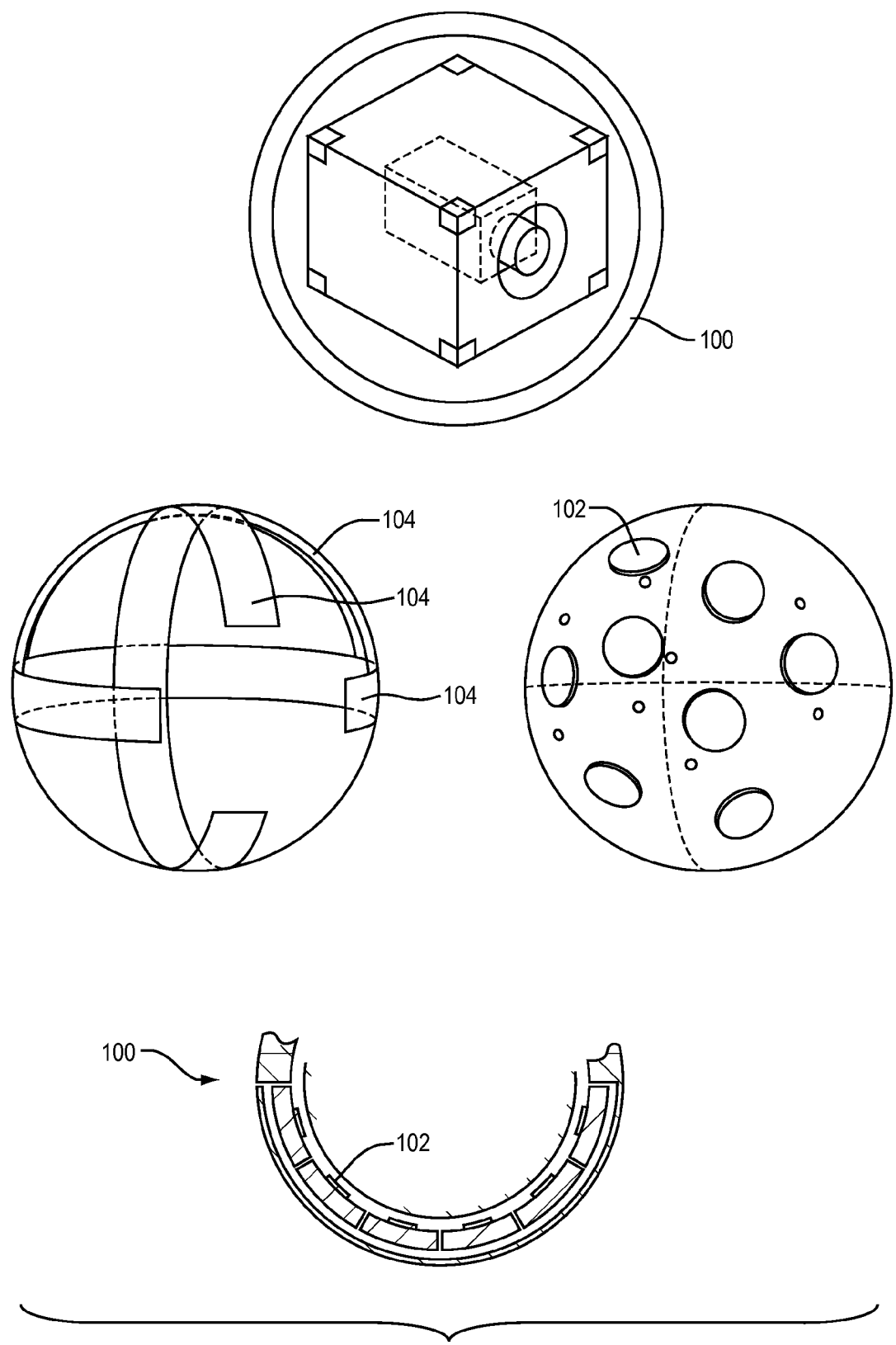
FIG. 23 depicts pertinent portions of a gimbal employing an air bearing between spheres along with low-friction support pads (e.g. TEFLON) and linear motors within the spheres.
Figure 24:
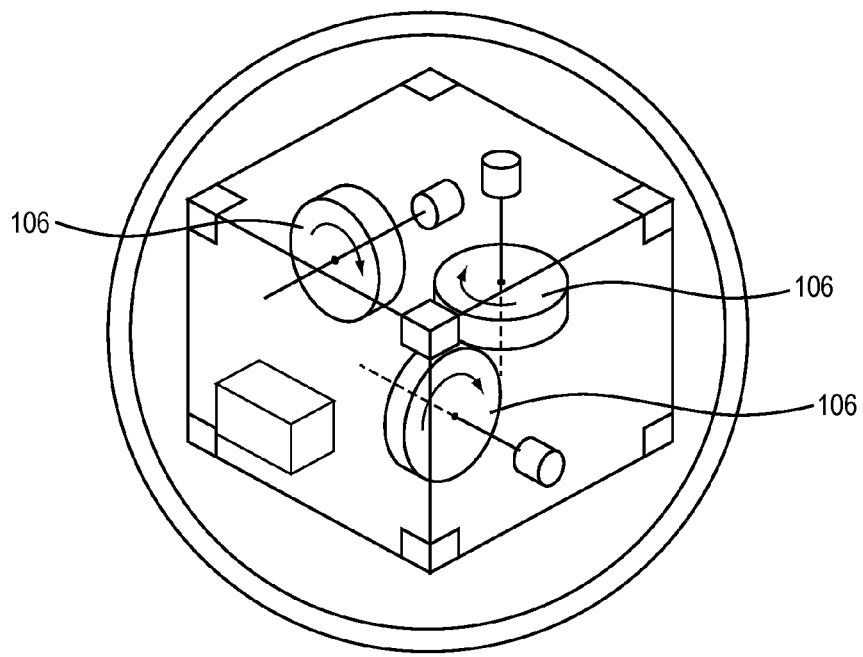
FIG. 24 is a diagram showing the use of momentum reaction wheels to adjust attitude.
Figure 25:
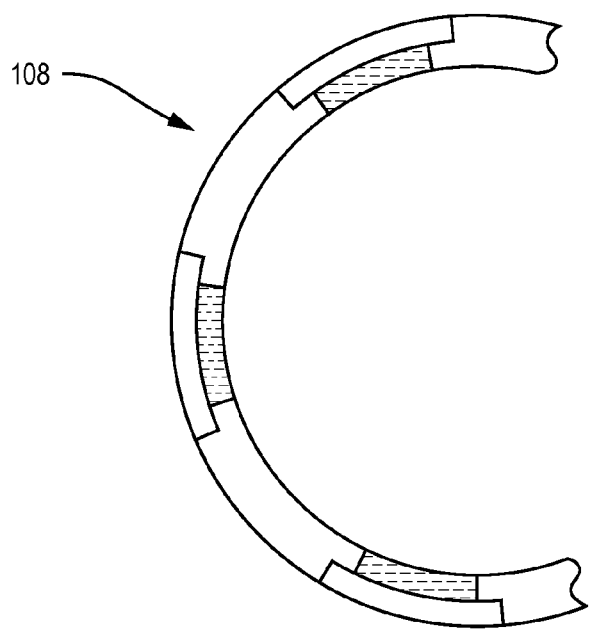

The gimbal may employ other types of drive mechanisms including the following:
   a. Harmonic drive
   b. Belt drive
   c. Gear drive
   d. Viscous coupling The gimbal may also employ other types of position encoders, including:
   a. Inductosyn encoder (multiphase electrical)
   b. Optical encoders using Talbot effect
   c. Optical encoders using transmission gratings The gimbal may employ other support and drive mechanisms including the following:
   a. Air bearing 100 between spheres (FIG. 23) with low-friction support pads 102 (e.g. TEFLON)
   b. Linear motors 104 within the shells (FIG. 23)
   c. Momentum reaction wheels 106 to adjust attitude (FIG. 24)
   d. Wet or dry fluid bearing 108 between shells (FIG. 25); high surface tension; may employ attractant and repellant on shell surfaces to adhere fluid to one and avoid shearing with the other.

Figure 26:
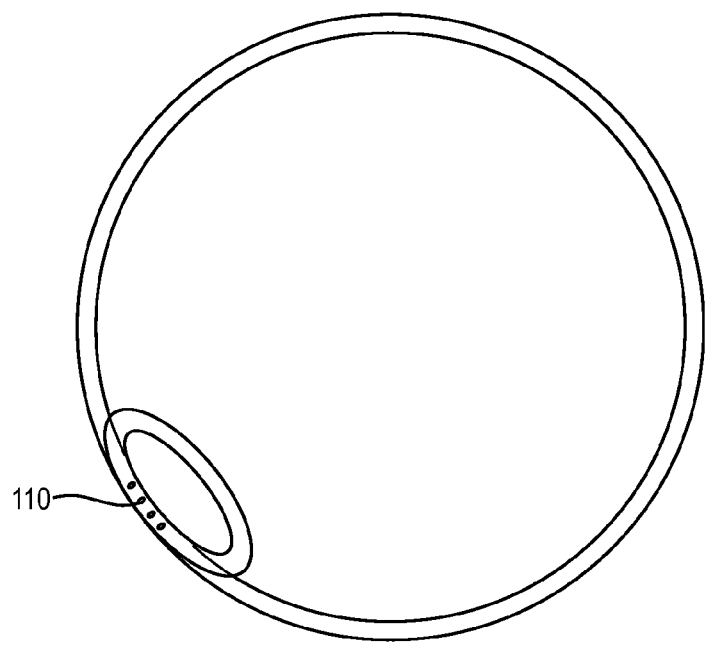
FIGS. 26-27 depict gimbal shells having integral wire channels to hold wires or fiber optic cable(s) for motors, encoders, and payload/sensor wires.
Figure 27:
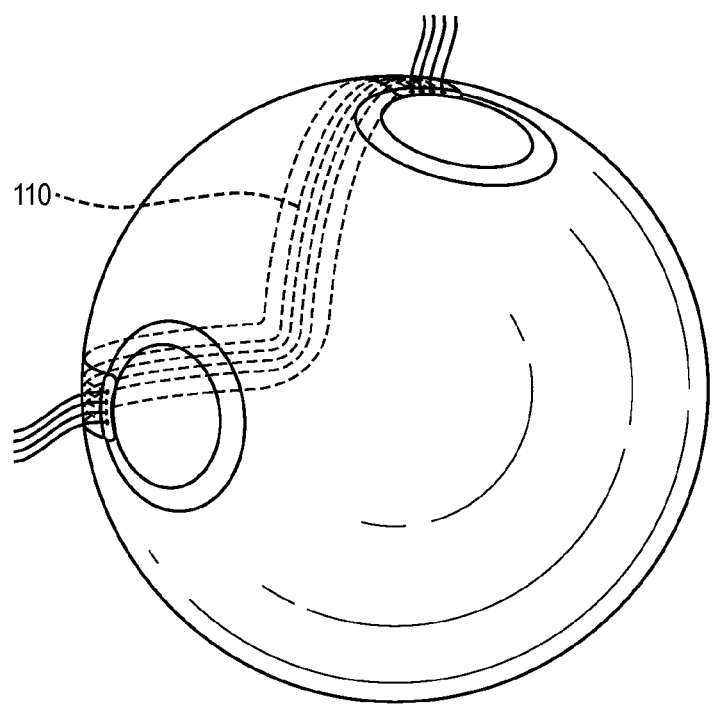

The gimbal shells can have integral wire channels 110 to hold wires or fiber optic cable(s) including flat /ribbon for motors, encoders, and payload/sensor wires (FIGS. 26-27). Channels can be depressions in shell, either left uncovered or covered.

Figure 28:
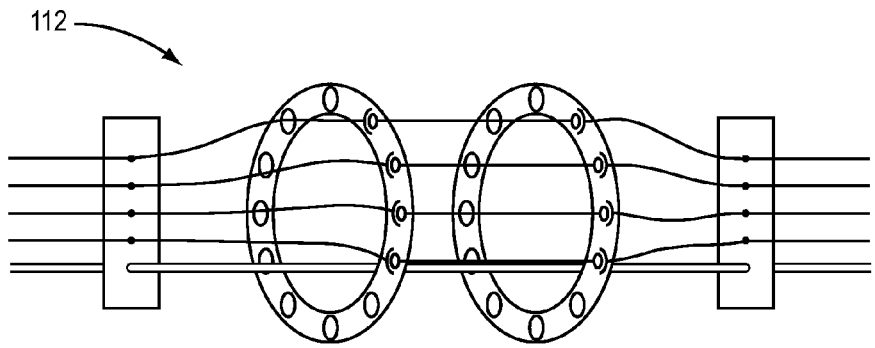
FIGS. 28-30 show a gimbal including rotary joint twist capsule electrical and or fiber optic as integral part of a gimbal drive assembly.
Figure 29:
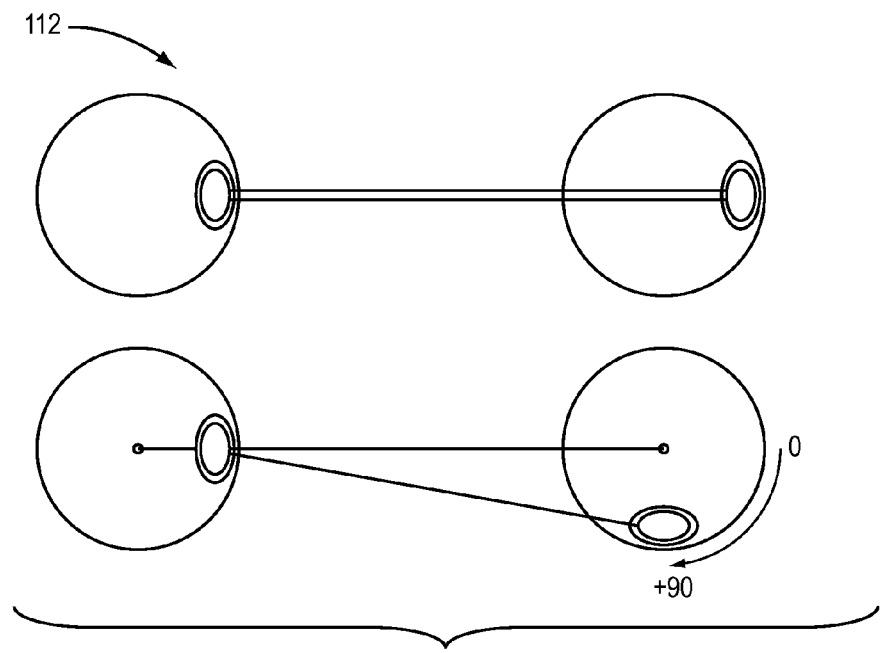
Figure 30:
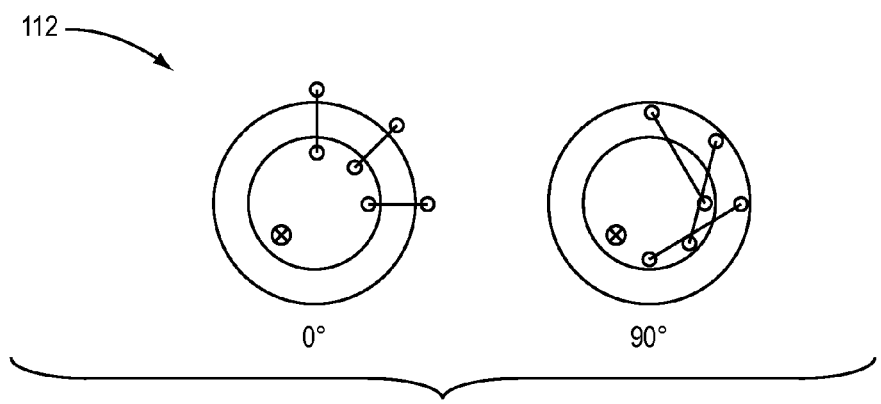

The gimbal may include rotary joint twist capsule 112 electrical and or fiber optic as integral part of the drive assembly (FIGS. 28-30). Slip rings can also be used to pass signals across the shells.

Figure 31:
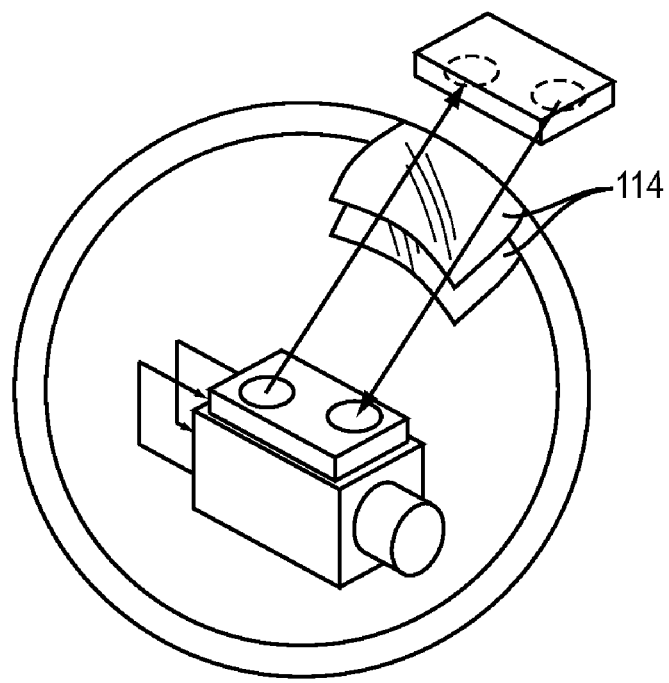
FIGS. 31-32 depicts a gimbal in which signals from the payload (e.g., camera) are passed optically through a transparent portion of the gimbal shells.
Figure 32:
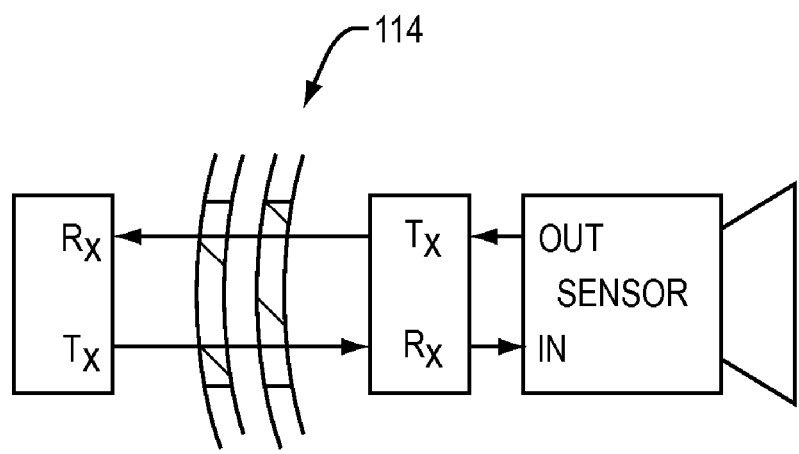

Signals from the payload (e.g., camera) can be passed optically through the transparent portion 114 of the gimbal shells (FIGS. 31-32).

Figure 33:
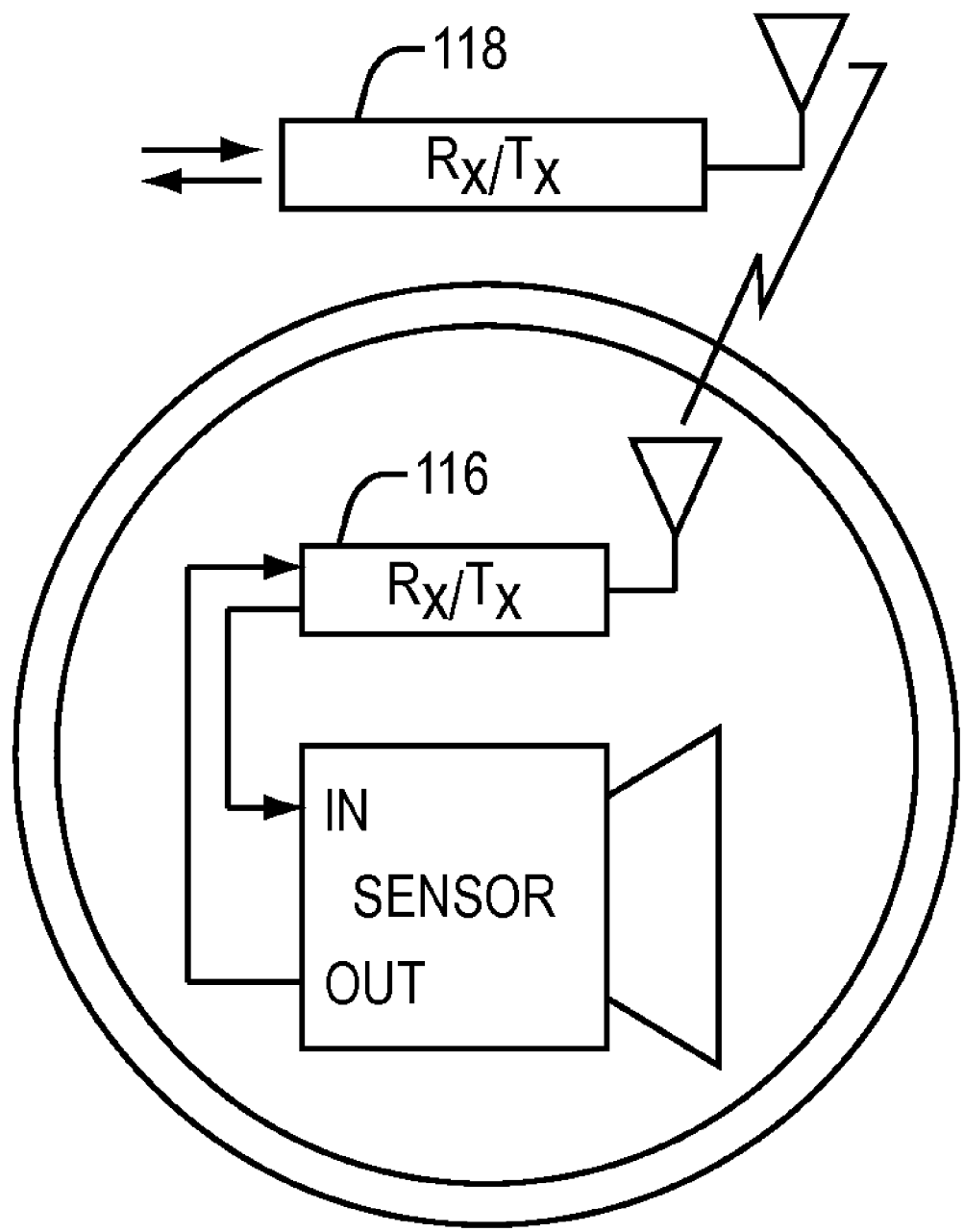
FIG. 33 depicts a gimbal in which signals from the payload are sent wirelessly via a transceiver across the shells to an external electronic transceiver.

Signals from the payload can be sent wirelessly via a transceiver 116 across the shells to an external electronic transceiver 118 (FIG. 33).

In gimbals employing a transparent window such as the first gimbal 48, it may be desirable to implement the transparent window in a segmented fashion rather than a single continuous sheet. The segments may be relatively small, flat window segments joined together at their edges.

The gimbal can employ inertial stabilization using an inertial reference measurement unit (IRMU) on the innermost gimbal. An IRMU enables geolocation of where the sensor is pointing in inertial space. Different types of IRMU may be employed, including the following:
   i. MEMS based
   ii. FOG based
   iii. Mechanical based
   iv. Integrated optics based
   v. Laser Ring Gyro based The gimbal may employ an inertial control design that includes one or more of the following:
   a. Linear multivariable techniques such as:
   i. H-Infinity
   ii. H-2
   iii. Mu-Synthesis
   iv. Loop-Transfer Recovery ("LTR")
   v. Individual channel design ("ICD")
   b. Nonlinear techniques such as:
   i. Inverse kinematic control
   ii. Feedback linearization
   iii. Sliding mode control While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A gimbal for controlling the orientation of a sensor payload to be carried by the gimbal, comprising:
    a substantially spherical first shell configured for rotation about a first axis; and
    a payload support structure disposed within and rotatably coupled to the first shell by a direct-drive rotational motor disposed between the first shell and the payload support structure, the direct-drive rotational motor having (i) a rotor housing attached to one of the first shell and the payload support structure and (ii) a stator housing attached to the other of the first shell and the payload support structure, the payload support structure being configured for rotation about a second axis with respect to the first shell, the second axis being orthogonal to the first axis,
    wherein the rotor housing and stator housing rotate with respect to each other about the second axis.

2. A gimbal according to claim 1, wherein the first shell is an outermost shell of the gimbal.

3. A gimbal according to claim 1, further comprising a second shell in which the first shell is rotatably disposed, the second shell being rotatable about a third axis orthogonal to both the first and second axes.

4. A gimbal according to claim 1, wherein the first shell includes a ribbed or pocketed structure to reduce weight and increase stiffness.

5. A gimbal according to claim 1, wherein the payload support structure is a substantially spherical second shell.

6. A gimbal according to claim 5, further comprising an air bearing and low-friction support pads between the first and second shells.

7. A gimbal according to claim 5, further comprising momentum reaction wheels to adjust gimbal attitude.

8. A gimbal according to claim 5, further comprising high-surface-tension fluid bearings between the first and second shells.

9. A gimbal according to claim 1, wherein the first shell comprises an integral wire channel to hold signal cables.

10. A gimbal according to claim 9, wherein the integral wire channel comprises a depression in the first shell.

11. A gimbal according to claim 1, further comprising a drive assembly including a rotary joint twist capsule for conduction of signals.

12. A gimbal according to claim 1, further comprising a payload operative to pass payload signals wirelessly via a transceiver across the first shell to an external electronic transceiver.

13. A gimbal according to claim 1, further comprising an inertial reference measurement unit (IRMU) on the payload support structure for inertial stabilization.

14. A gimbal according to claim 1, further comprising a slip ring between the first shell and the payload structure to pass signals therebetween.

15. A gimbal according to claim 1, further comprising components of inertial reference measurement unit distributed within the gimbal.

* * * * *